United States Patent [19]

Kozah et al.

[11] Patent Number: 5,337,149
[45] Date of Patent: Aug. 9, 1994

[54] COMPUTERIZED THREE DIMENSIONAL DATA ACQUISITION APPARATUS AND METHOD

[76] Inventors: Ghassan F. Kozah; Charles M. Donoghue, both of 3530 Bee Caves Rd., #210, Austin, Tex. 78746

[21] Appl. No.: 974,924

[22] Filed: Nov. 12, 1992

[51] Int. Cl.$^5$ .............................................. G01B 11/24
[52] U.S. Cl. ........................................ 356/376; 356/5;
364/560; 364/561
[58] Field of Search .................. 356/4, 5, 3, 375, 376;
364/560, 561

[56] References Cited

U.S. PATENT DOCUMENTS

| | | | |
|---|---|---|---|
| 4,205,385 | 5/1980 | Erickson et al. | 364/560 |
| 4,282,571 | 8/1981 | Giovannoli et al. | 364/562 |
| 4,295,201 | 10/1981 | Wiklund | 364/561 |
| 4,375,921 | 3/1983 | Morander | 356/381 |
| 5,050,112 | 9/1991 | Hedglen et al. | 364/560 |
| 5,091,869 | 2/1992 | Ingram et al. | 364/560 |
| 5,175,601 | 12/1992 | Fitts | 356/376 |

FOREIGN PATENT DOCUMENTS

WO9012330 10/1990 PCT Int'l Appl. ............ 356/3

OTHER PUBLICATIONS

Andrew Safer, Faro Technologies Takes CMM into the Field, Nov. 1992, pp. 62-64.

*Primary Examiner*—F. L. Evans
*Attorney, Agent, or Firm*—Shaffer & Culbertson

[57] ABSTRACT

An apparatus and method for creating a computer model of a large three dimensional object as data is acquired. The invention includes a measuring device, a computer that includes a computer aided drafting program, a data transmission device, and a viewing screen. The first embodiment of the measuring device includes a distance measuring device that takes measurements from a stable, moveable location. The location of measured points is calculated based upon the distance to the measured point and the orientation of the measuring device. In both the second and third embodiments of the measuring device, the location and orientation of the device is tracked by a microcontroller based on information supplied by an inertial measurement unit containing a plurality of linear and angular accelerometers. The second embodiment includes a distance measuring device and the third includes a measuring wand of a known length. The computer calculates the location of measured points with these two embodiments based upon the distance to the measured point as well as the location and orientation of the device when the point is measured. The apparatus and method operate such that the user interfaces with the computer aided drafting program and uses the measuring device as an input device to enter data into the computer aided drafting program. Thus, the user may create a complete model of the object solely by taking physical measurements of an object or space without any limitations on movement around or through it.

14 Claims, 9 Drawing Sheets

COMPUTERIZED THREE DIMENSIONAL DATA ACQUISITION APPARATUS AND METHOD

BACKGROUND OF THE INVENTION

This invention relates to a computerized three dimensional data acquisition apparatus and method for acquiring, inputting, and graphically displaying data concerning large three dimensional objects and spaces. More particularly, the invention relates to an apparatus and method for acquiring data directly from the physical objects and spaces, inputting the data to a computer aided drafting (CAD) program and graphically displaying the data as it is acquired to guide the input process and verify the results. In essence, the invention operates such that the user interfaces with the CAD program and uses the apparatus as an input device to enter data into the CAD program.

Computer models of three dimensional objects and spaces, such as building interiors and exteriors, accident scenes, and utility placements are used for many purposes. Building models are used as a source of information for real estate sales, leasing, and management. Architects use three dimensional computer models of buildings to optimize building layouts and to plan building renovations and remodeling among other things. Investigators use limited measurements and photographic means to record the overall context and disposition of the evidence at crime and accident scenes.

Computer models of buildings are usually derived from building plans. Unfortunately, the buildings as constructed often differ from their building plans. When an architect designs a building, he records the design on plans. The builder then uses the plans as a guide in the construction process. The builder, however, almost always constructs the building in a manner that varies at least slightly from the building plans. These variations are usually recorded on the building plans and the resultant corrected plans are called "as built" drawings. The builder generally measures the variations by hand and therefore the measurements are often inaccurate. Thus, the "as built" drawings provide general information on the variations from the building plans but they neither accurately portray the variations nor describe the variations in detail. Resultantly, the computer model is only as accurate as the plans or drawings. In the case of many buildings, plans do not even exist.

Frequently, then, the only way to create an accurate computer model of a building or any other large space is to physically measure the spatial characteristics of the building and to input the measured data manually into the computer program. In a normal procedure, a worker takes the measurements manually with a tape measure and later inputs the data into the computer. This technique also is slow and expensive and is even more prone to error than is creating a computer model from drawings.

Devices and methods have been disclosed for taking physical measurements in a manner that is more accurate and inexpensive than manually taking the measurements. For example, U.S. Pat. Ser. No. 4,295,201 to Wiklund discloses a device for fieldwise mapping an area. The device, in its preferred embodiment, is mounted on a tripod and comprises an electronic distance meter, a vertical angle unit, a horizontal angle unit that includes a detector that detects the earth's magnetic field, and a calculating unit. The device uses the earth's magnetic field to compute the distance from a fixed point to a measuring point on an object and the direction from the fixed point to the measuring point in the horizontal plane relative to a reference direction.

U.S. Pat. Ser. No. 4,205,385 to Ericson, et al. discloses a surveying system comprising a theodolite, a level sensor, and an on board microcomputer that can be used in conjunction with an electronic distance measuring instrument. The device translates raw data, comprising horizontal angle, vertical angle, and slope range, into the more useful component vectors, horizontal distance, latitude, departure, and elevation.

U.S. Pat. Ser. No. 5,091,869 to Ingram et al., discloses a method for creating a two dimensional floor plan of an existing building. The Ingram et al. device uses an electronic distance measuring device, a theodolite, and a data collector to measure the angles and distances to prominent points on the interior walls from an interior traverse point. The data collector stores the data for a later transfer to a separate computer. In a separate operation, the computer uses the data to create a two dimensional floor plan.

While the Ingram et al. method produces a floor plan of a building, it is only a variation of the traditional surveying methods as are used with the Ericson et. al system and the Wiklund instrument. Ingram et al. teaches a method for using surveying tools to survey the floor of a building. The data gathered by the method is primarily in the form of distances and angles which are only later converted to the cartesian coordinate system by a computer. However, the Ingram et al. method lacks the ability to generate an accurate three dimensional computer model, to graphically display the data as it is acquired, and to allow the user to interact with the CAD program during the data acquisition process.

A general area of technology, known as coordinate measuring machines (CMM) provides devices that digitize the precise geometry of discrete objects. The technology uses a short instrumented articulated arm with a stylus or a short range electronic distance measuring device (laser light or ultra-sound) that the user traces over the surface of the object. When prompted by the user, the device can record the location of the stylus' point or the electronic distance measuring device's range and transmit it to a computer for processing into a digital model of the object. In industry, the apparatus is fixed and is generally limited to use on relatively small discrete objects for proofing or copying the shape in the manufacturing process. Additionally, there are also some medical applications that use this type of device for precisely modeling parts of the body and similar objects.

Thus, there is a need in the art for a device and a method that overcomes these problems and limitations and that conveniently acquires data from and generates a three dimensional computer model of a large object or space, and that allows the user to view the information as it is acquired.

SUMMARY OF THE INVENTION

Accordingly, it is an object of the present invention to provide an apparatus and method for producing a three dimensional computer model of a large three dimensional object or space in an accurate and inexpensive manner. More particularly, the present invention accomplishes this object using a measuring device, a computer, and associated equipment and software. Residing on the computer is a computer aided drafting (CAD) program and associated software to receive data measured by the measuring device, to input the data to the CAD program, and to interact with the CAD program. Also included is a display screen that the computer uses to graphically display the measured data as it is acquired allowing the user to use the CAD system and to check the acquired data for accuracy. This invention also allows input of data into the CAD program by conventional means such as a mouse, keyboard, or digitizer. Thus, the user has great flexibility in creating the three dimensional model and can choose the most efficient input means.

This invention discloses three alternative embodiments for the measuring device. A first embodiment is called the "static" device and includes an electronic distance measurement device (EDM) with a sitting view finder mounted in a yoke, yoke mounted sensors which sense the orientation of the measuring device along two orthogonal axes, a microcontroller, and an associated portable targeting means. In the preferred embodiment, the EDM uses a visible light laser to measure distances, but sonar or other technologies could also be used.

In use, the "static" device must be mounted on a tripod or placed in some other position that stationary in relation to the object being measured but does not need to be leveled. The "static" device includes a measuring axis along which measurements are taken. The user takes distance and angle measurements by aligning the measuring axis on a point on the object and then triggering the device. When the device is triggered, the EDM measures the distance to the point and, at the same time, the microcontroller reads the orientation of the EDM in its yoke. This provides the spherical coordinates of the measured point, relative to the "static" device. The microcontroller then inputs the spherical coordinates to the CAD software. The CAD software then converts the coordinates to a usable format for processing.

A second embodiment of the measuring device is called the "free floater" device and includes an EDM, an inertial measurement unit (IMU) with a plurality of linear and angular accelerometers, and at least one microcontroller. The microcontroller continuously calculates the position and orientation of the "free floater" device in real-time based upon readings from the IMU. The "free floater" device may be either hand-held or tripod mounted. When a measurement is taken, the EDM measures the distance to the point along the measuring axis and, at the same time, the computer reads the orientation and position of the device. The computer then calculates the coordinates of the measured point and inputs the data to the CAD program for processing.

A third embodiment of the measuring device is called the "semi-free floater" device and includes a wand of a known length aligned on the measuring axis, an inertial measurement unit (IMU) with a plurality of linear and angular accelerometers, and at least one microcontroller. The microcontroller continuously calculates the position and orientation of the measuring device in real-time. The user takes measurements by touching points on the object with a measuring end of the wand. When the measurement is taken, the computer reads the orientation and position of the device, calculates the coordinates of the measured point, and inputs the data to the CAD program for processing.

The present invention also includes a method for obtaining a computer model of a large three dimensional object or space using the above described embodiments. The method includes establishing local and global reference frames, selecting an element or entity type to be measured, measuring the location of a plurality of points on the selected element, inputting the coordinates of the points to the CAD program, converting the coordinates of the measured points to the global reference frame, and as an end result, after repeated operations, creating a three dimensional computer model of the object being measured.

The present invention provides an apparatus and method for generating a three dimensional model of a large object or space. The apparatus and method are inexpensive, accurate, and easy to use. These and other objects, advantages, and features of the invention will be apparent from the following description of the preferred embodiment, considered along with the accompanying drawings.

DESCRIPTION OF PREFERRED EMBODIMENTS

A preferred embodiment of the apparatus of the present invention including a first preferred embodiment of a measuring means is illustrated by way of example in FIGS. 1 through 4. With specific reference to FIG. 1, a computerized three dimensional model data acquisition system 10 comprises the first preferred embodiment of the measuring means 12 called the "static" device, a microcontroller 13, a computer 16, and a hand held controller 18. The microcontroller 13 is mounted on and directly connected to the "static" device 12 in this preferred embodiment, but it could be mounted separately. The microcontroller 13 connects directly to the measuring means 12, to the hand held controller 18 by way of connector 24, and to the computer 16 by way of data transmission means 14. The measuring device 12 may be mounted atop a tripod 22 or any suitable support.

Figure 1:
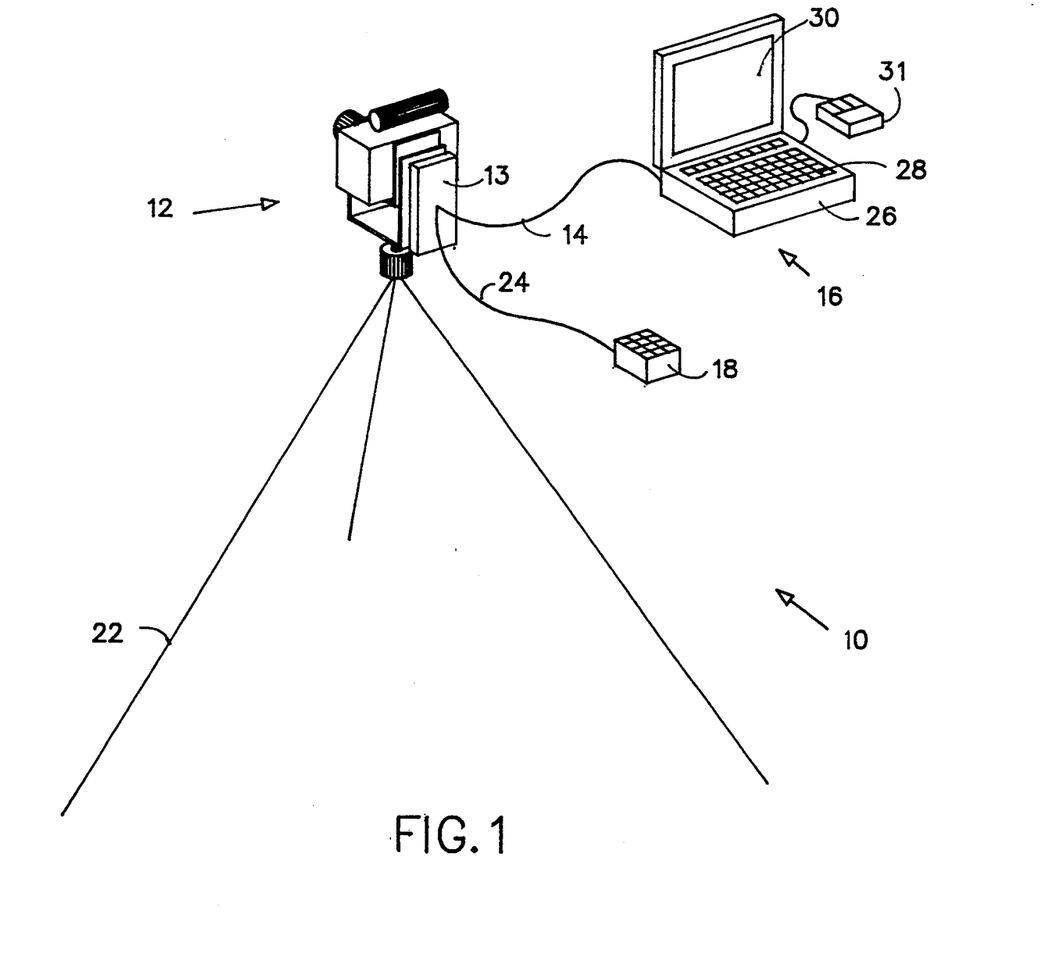
FIG. 1 is a mostly schematic perspective view of an apparatus embodying the principles of the present invention including the "static" measuring device.

The computer 16 includes a case 26, a keyboard 28, a viewing screen 30, a mouse 31, and standard internal components including a power supply that are not shown but are all known in the art. The computer 16 could also include other input devices that are known in the art but not shown. The computer 16 has sufficient capability to perform the computations required by this invention and supports a computer aided drafting program. In this preferred embodiment, the computer 16 is a notebook or laptop variety, but desktop, palmtop, pentop, and other varieties could also be used. Associated software, including a computer aided drafting (CAD) program is loaded on the computer 16 but not shown. General CAD application software of this type is well known in the art.

Figure 2:
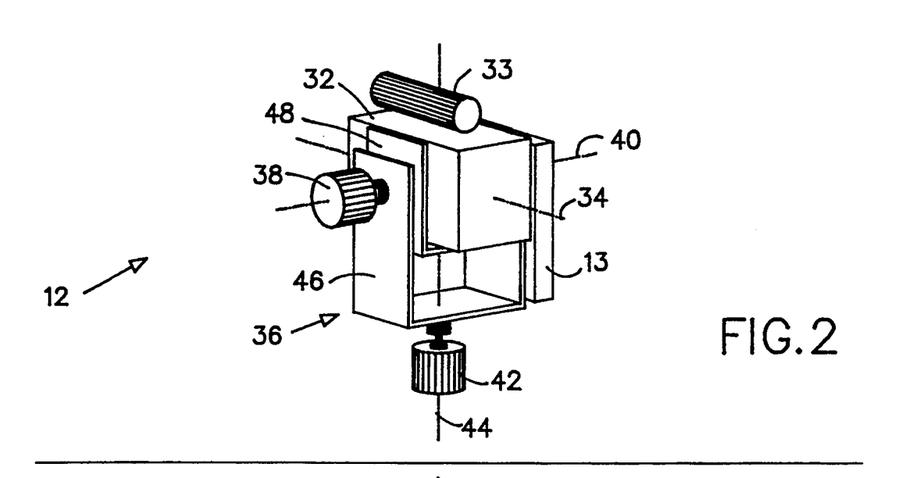
FIG. 2 is a mostly schematic perspective view of the "static" measuring device.
Figure 3:
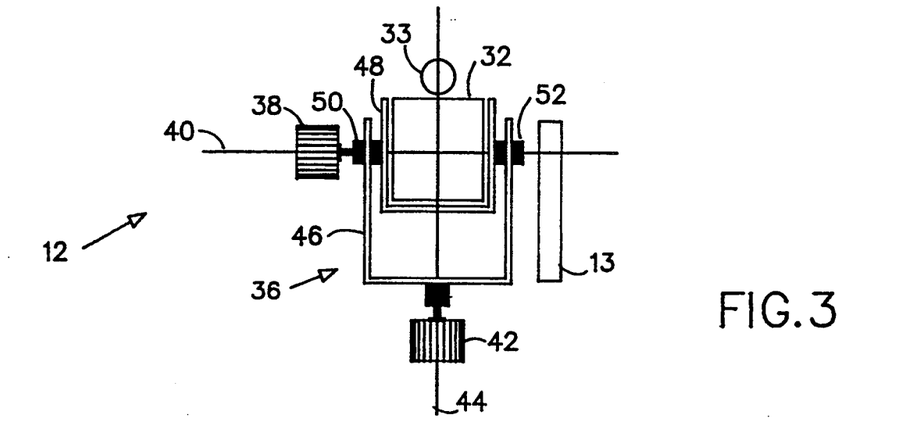
FIG. 3 is a mostly schematic front view of the "static" measuring device.
Figure 4:
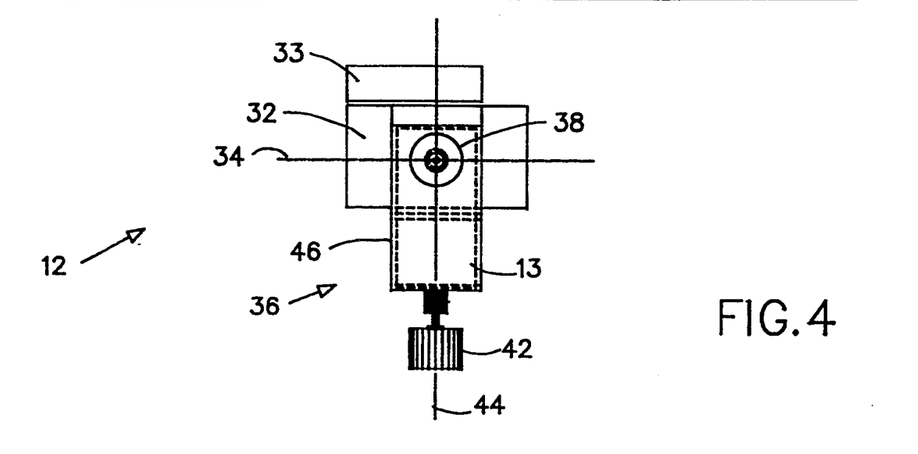
FIG. 4 is a mostly schematic side view of the "static" measuring device.

With specific reference to FIGS. 2 through 4, the "static" device 12 comprises an electronic distance measuring device (EDM) 32 aligned along a measuring axis 34, a view finder 33, an articulated yoke 36, a first sensing device 38 along a first orthogonal axis 40, called the "pitch" axis, and a second sensing device 42 along a second orthogonal axis 44, called the "yaw" axis.

The EDM 32 works by sending a visible laser light beam to a point on the object, receiving a reflection from the light beam, and then calculating the distance to the point on the object. Other technologies besides the laser light beam may be used by the EDM 32 to measure distances, such as radio and ultrasonic methods, among others. Further, in this embodiment, the data transmission means 14 is an electrical cable. However, it is not limited to such and can also be a radio communication or other communication device known in the art.

The articulated yoke 36 includes an outer member 46 and an inner member 48. The outer member 46 connects to the inner member 48 by a first connector 50 and a second connector 52 along the "pitch" axis 40. The EDM 32 is firmly attached to the inner member 48 so that the EDM 32 and the inner member 48 rotate on the "pitch" axis 40. The outer member 46 rotates on the "yaw" axis 44. Because the microcontroller 13 continually monitors the readings from the first sensing device 38 and the second sensing device 42, the orientation of the EDM 32 within the yoke 36 is always known. The device does not have to be leveled.

A user measures the location of a point on an object with the "static" device 12 by aligning the measuring axis 34 with the selected point and triggering the "static" device 12 to take a measurement by pushing a button on the hand held controller 18. The microcontroller 13 then transmits the current readings from the EDM 32, the "pitch" axis 40 angle sensing device 38, and the "yaw" axis 44 angle sensing device 42 to the computer 16 across the data transmission means 14.

Figure 5:
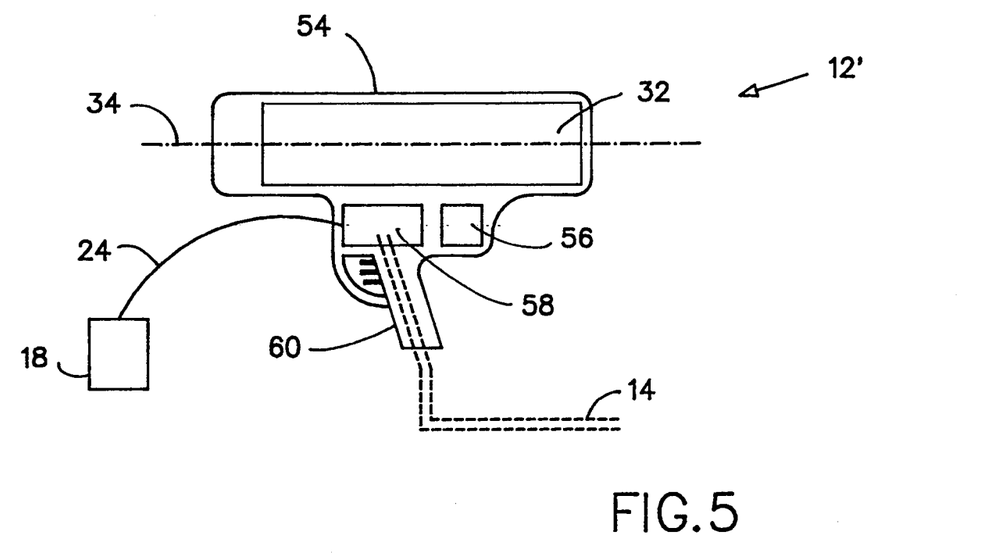
FIG. 5 is a mostly schematic side view of the "free floater" measuring device.

FIG. 5 shows a second embodiment of the measuring means called the "free floater" device 12'. The "free floater" device 12' comprises a shell 54, an EDM 32 that is aligned along a measuring axis 34, a view finder (not shown), an inertial measurement unit 56, including three linear accelerometers aligned along three axes fixed to the device 12' and two or more angular accelerometers that measure angular displacement on the three axes, at least one microcontroller 58, a handle with triggers 60, and a power supply (not shown). The "free floater" device may either be hand-held or mounted atop a structure.

The microcontroller 58 continually calculates the location and orientation of the "free floater" device 12' in real-time based upon readings from the inertial measurement unit 56. When a user measures the location of a point using the "free floater" device 12', he or she aligns the measuring axis 34 on the point, and triggers the device 12'. The EDM 32 measures the distance to the point, the microcontroller 58 records the location and orientation of the "free floater" device 12', and the microcontroller 58 transmits the distance, location, and orientation data to the computer 16 across the data transmission means 14. The computer 16 then computes the location of the measured point based upon the information received.

Figure 6:
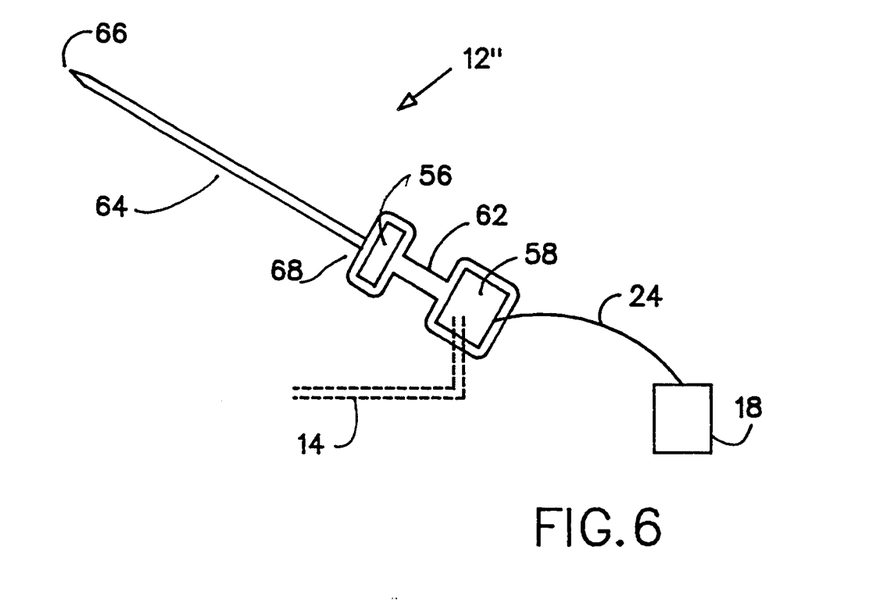
FIG. 6 is a mostly schematic side view of the "semi-free floater" measuring device.

FIG. 6 shows a third preferred embodiment of the measuring means called the "semi-free floater" device 12". The "semi-free floater" device 12" comprises a handle 62, a measuring wand 64 of a known length, an inertial measurement unit 56, including three linear accelerometers aligned along three axes fixed to the "semi-free floater" device 12" and two or more angular accelerometers that measure angular displacement on the three axes, a microcontroller 58, and a power supply (not shown). The measuring wand 64 includes a first measuring end 66 for touching measured points and a second end 68 for mounting the measuring wand 64 in the handle 62.

The microcontroller 58 continually calculates the location and orientation of the "semi-free floater" device 12" in real-time based upon readings from the inertial measurement unit 56. A user measures a point with the "semi-free floater" device 12" by touching the desired point on the object with the measuring end 66 of the measuring wand 64 and triggering the device to take a measurement. When the point is touched, a signal is sent to the microcontroller 58, the microcontroller 58 records the location and orientation of the "semi-free floater" device, and writes the data across the data transmission means 14 to the computer 16. The computer 16 then computes the location of the measured point based upon the location and orientation information and the known length of the wand.

Figure 7:
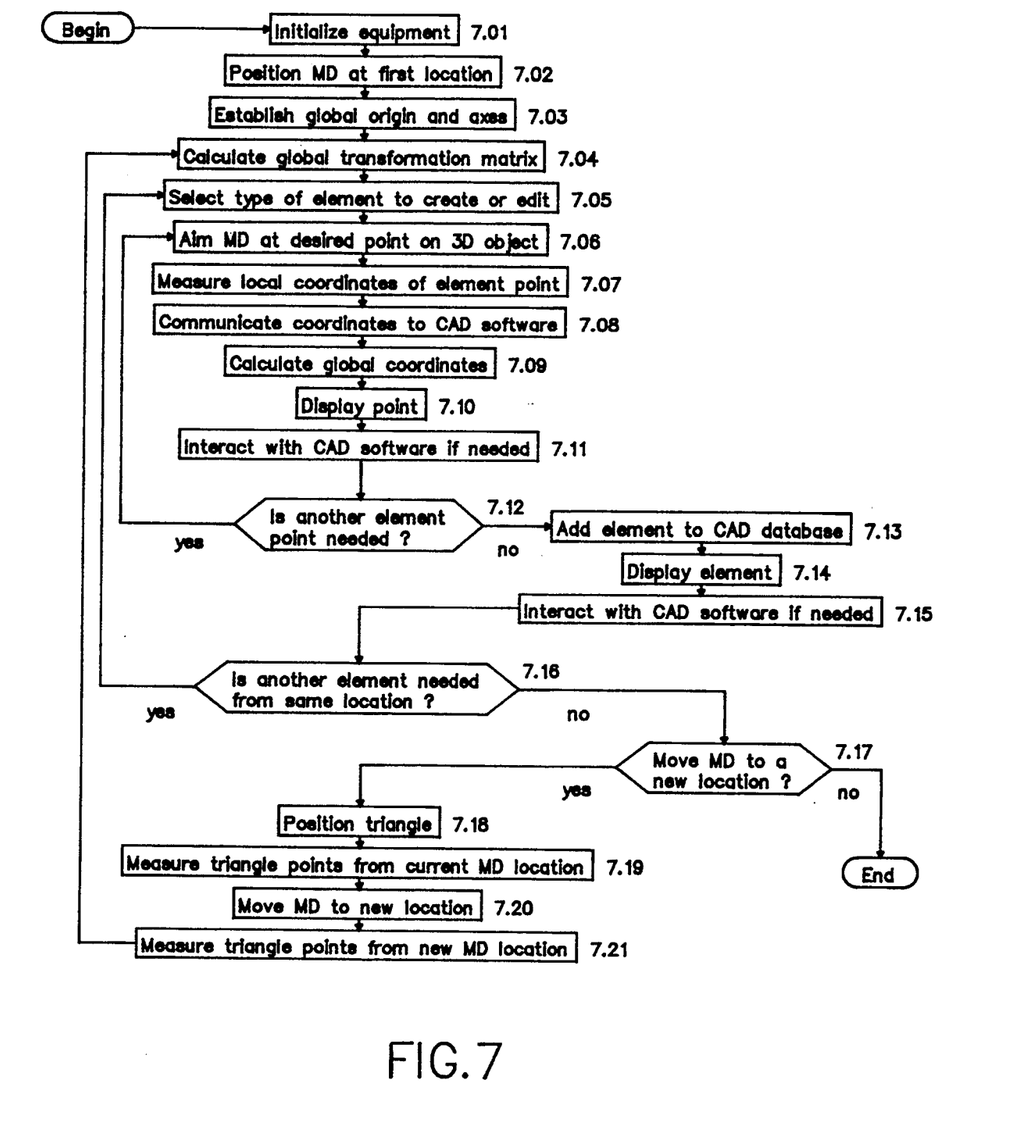
FIG. 7 is a flow chart of a first preferred method embodying the principles of the present invention using the "static" measuring device.

The present invention also provides a method for creating a three dimensional computer model of a large three dimensional object or space. FIG. 7 is a flow chart containing the steps of a first preferred method embodying the principles of the present invention. This embodiment of the method works in conjunction with the "static" measuring device 12 as shown in FIGS. 1 through 4.

As shown in FIG. 7, the first step of the first preferred method of the present invention is initializing the equipment (block 7.01). This step includes powering up all of the equipment and ensuring that it is operable. The next step is selecting a first measuring location for the measuring device from which data will be recorded and placing the "static" device 12 at that location (block 7.02). This placement establishes a first local reference frame, establishing the origin and the zero reference angles on the "pitch" 40 and "yaw" 44 axes. Subsequent movement of the EDM 32 in its yoke 36 result in angular displacements about the "pitch" 40 and "yaw" 44 axes that reflect the orientation of the measuring axis 34 of the "static" device 12 relative to the reference angles.

Figure 8:
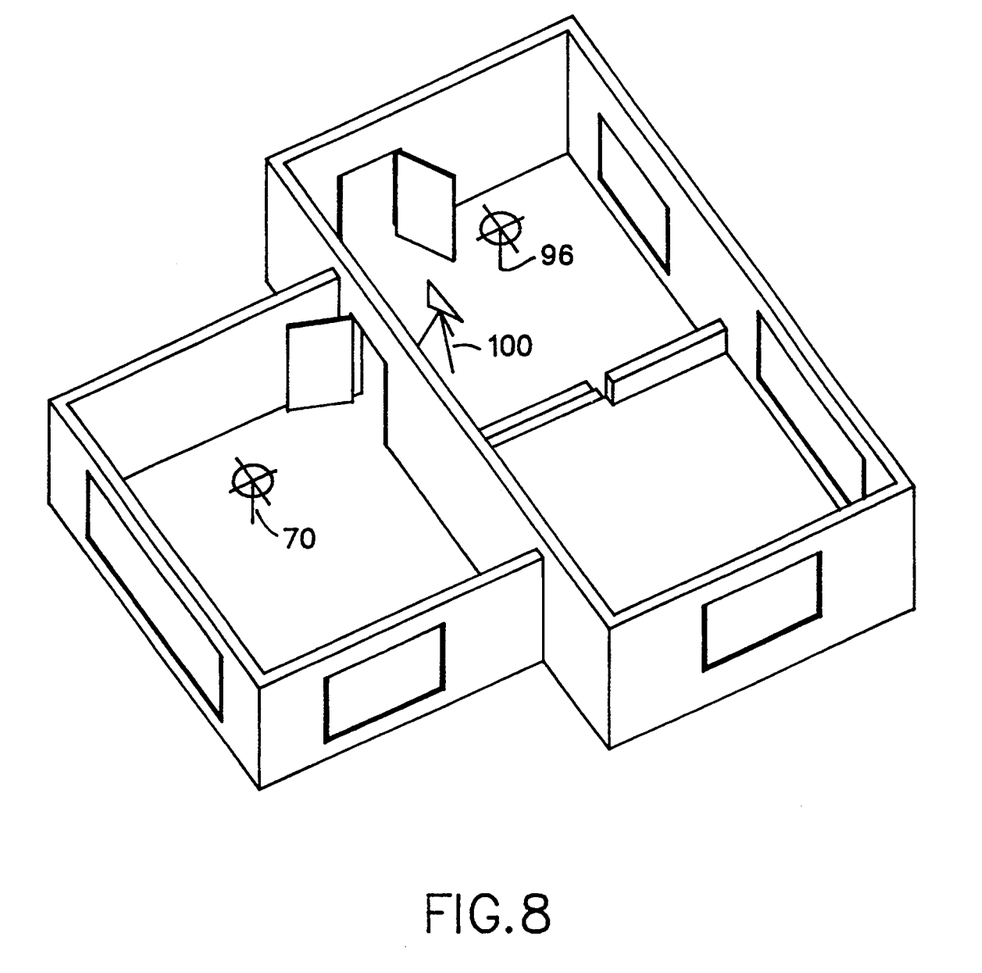
FIG. 8 is an isometric view of the interior space that is used to further describe the method as described in FIG. 7.

Next is the step of establishing a global origin and reference frame that remains fixed relative to the three dimensional object (block 7.03). Referring to FIG. 8, an isometric view of a building space to be measured, and FIG. 9 a perspective top view of a first room in the building space, the step of establishing the global reference frame is described in more detail. The "static" device 12 is located at a first measuring location 70. The user, for example, chooses a point that serves as the origin of the global reference frame and measures the location of that point, $P_1$ 72, with the "static" device 12.

Figure 9:
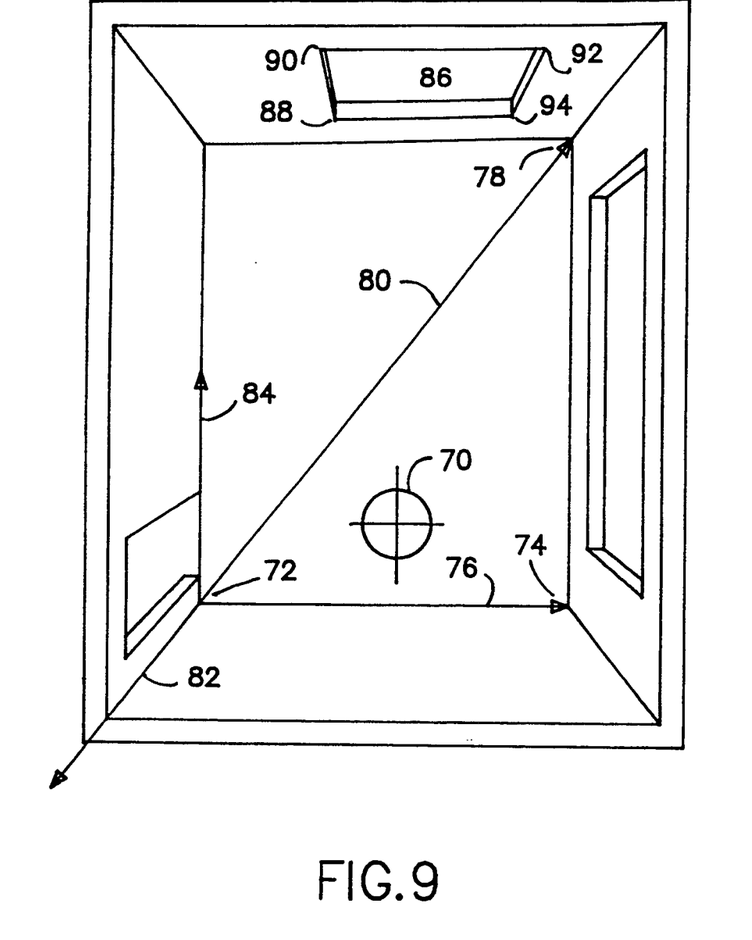
FIG. 9 is a perspective top view of a first room in the interior example of FIG. 8 which is used to further describe the method described in FIG. 7.

When this point is measured, the EDM 32 measures the distance to the point, called the range, while the "pitch" angle sensing device 38 and the "yaw" angle sensing device 42 respectively measure the "pitch" and "yaw" angles of the EDM 32 in its yoke 36. When prompted by the user, the microcontroller 18 transmits the range and the "pitch" and "yaw" angles to the computer 16. The computer 16 then converts the data as recorded in spherical coordinates to cartesian coordinates in the local reference frame. The coordinates of the measured point, $X_1$, $Y_1$, and $Z_1$, locate the measured point $P_1$ 72 in cartesian coordinates in the first local reference frame. The user next selects and measures the location of a second point, $P_2$ 74, such that point $P_2$ 74 does not coincide with point $P_1$ 72 and such that the vector $P_1 \rightarrow P_2$ 76, starting from the point $P_1$ 72 and extending to the point $P_2$ 74 defines the direction of the global X axis. The user then selects and measures a third point, $P_3$ 78, such that points $P_1$ 72, $P_2$ 76, and $P_3$ 78 are not collinear and such that the three measured points $P_1$ 72, $P_2$ 74, and $P_3$ 78, define the global X-Y plane (not shown). The computer then calculates the cross product of vector $P_1 \rightarrow P_2$ 76 and a vector $P_1 \rightarrow P_3$ 80 formed by points $P_1$ 72 and $P_3$ 78. The resulting vector 82 defines the direction of the global Z axis. The cross product of the Z axis vector 82 and the X axis vector 76 defines the direction of the global Y axis 84. Thus, the global coordinate system is established.

Referring again to FIG. 7, the next step of the method is calculating a matrix that transforms the coordinates of points in the first local reference frame to coordinates in the global reference frame (block 7.04). In the step of establishing the global reference frame (block 7.03), the CAD software calculated the cartesian coordinates, in the first local reference frame, of the three measured points $P_1$ 72, $P_2$ 74, and $P_3$ 78. The CAD software uses this information to create the transformation matrix (block 7.04). The matrix elements are a combination of algebraic and trigonometric equations and the derivation of the elements is based on three dimensional matrix operations that are well known in the art. A subsequent step of the method uses the transformation matrix to transform the coordinates of a measured point from coordinates in the local reference frame to coordinates in the global reference frame.

The next step is interacting with the CAD software to select an element or entity type that the user will be measuring (block 7.05). In the case of a building space, typical elements are wall surfaces, doors, windows, desks, cabinets, and ceilings among others. After the user selects an element, the CAD software prompts the user to measure a point on the element. The user then aligns the measuring axis 34 with a point on the object (block 7.06) and triggers the measuring device 12 with the hand held controller 18 to measure the location of the point (block 7.07).

The microcontroller 13 transmits to the computer 16, the range measured by the EDM 32 as well as the "pitch" and "yaw" angles measured respectively by the first sensing device 38 and the second sensing device 42 (block 7.08). Thus, the CAD software has data locating the measured point in spherical coordinates in the local reference frame. The coordinates are then convened to cartesian coordinates in the local reference frame and communicated to the CAD software. The next step is transforming the coordinates of the measured point from the local to the global reference frame (block 7.09). This transformation is performed using the transformation matrix created in the step of block 7.04.

Following is the step of displaying the point as measured on the screen 30 as a part of the three dimensional model (block 7.10). Next is the step of determining whether or not the point was validly measured and interacting with the computer aided drafting software if needed (block 7.11). This step could include cancelling the measured point, moving slightly the measured point, measuring additional points from another input device, or another interaction with the CAD software.

After the point is measured, as prompted by the CAD software, the user decides whether to measure additional points on the element. This decision is represented by block 7.12. If the answer is "YES", the method requires that the steps starting at block 7.06 be performed again. If the answer is "NO", the CAD software then adds the element as measured to the CAD program data base (block 7.13). Once written to the data base, the next step is displaying the element on the viewing screen from the CAD program (block 7.14). This step provides a further check on the validity of the acquired data. The next step, which is performed if needed, is interacting with the CAD software if needed (block 7.15).

Referring again to FIG. 9, the steps of blocks 7.05 through 7.15 are described in more detail by way of example. Suppose the user desires to enter the window 86 as an element in the computer model. The user first selects the window element from the menu of elements in the CAD program and the computer 16 prompts the user to measure a first point on the window 86. The user aligns the measuring axis 34 on a first point 88 on the window 86 and takes a measurement. The CAD software receives the coordinates of the measured point 88 and converts the coordinates to the global coordinate system. The CAD software displays the point on the screen 30 and the user checks its validity. The CAD software then prompts the user for another point. The user repeats the step of measuring a point for points 90, 92, and 94 and thereby creates a model of the window in the CAD program. The user may then interact with the CAD software, for example, if he or she desires to edit the window or display the window in a different viewing mode. After the element is created, the CAD software displays the model of the element and the user checks the element's validity.

Referring again to FIG. 7, the user next decides whether to measure another element from the first measuring location 70. This decision is represented by block 7.16. If the user decides to measure another element from this location 70, an answer of "YES" to test 7.16, the steps beginning at block 7.05 are performed again.

If the answer to test 7.16 is "NO", the user must then decide whether to move the "static" device 12 to a new measuring location 96. That decision is represented by test 7.17. If the user decides the model building process is complete, an answer of "NO" to test 7.17, no further steps are performed. But, If the answer is "YES", the next step is positioning a target 98, mounted on a tripod or another device, at a location 100 that has an unobstructed line of sight to the first measuring location 70 and the second measuring location 96 (step 7.18).

Following the step of positioning the target 98 is the step of measuring the coordinates of three points on the target 98 from the first measuring location 70 (block 7.19). Next is the step of moving the "static" device 12 to a new measuring location 96 and establishing a second local reference frame (block 7.20). Following is the step of measuring the coordinates of the three points on the target 98 from the second measuring location 96 (block 7.21).

Figure 10:
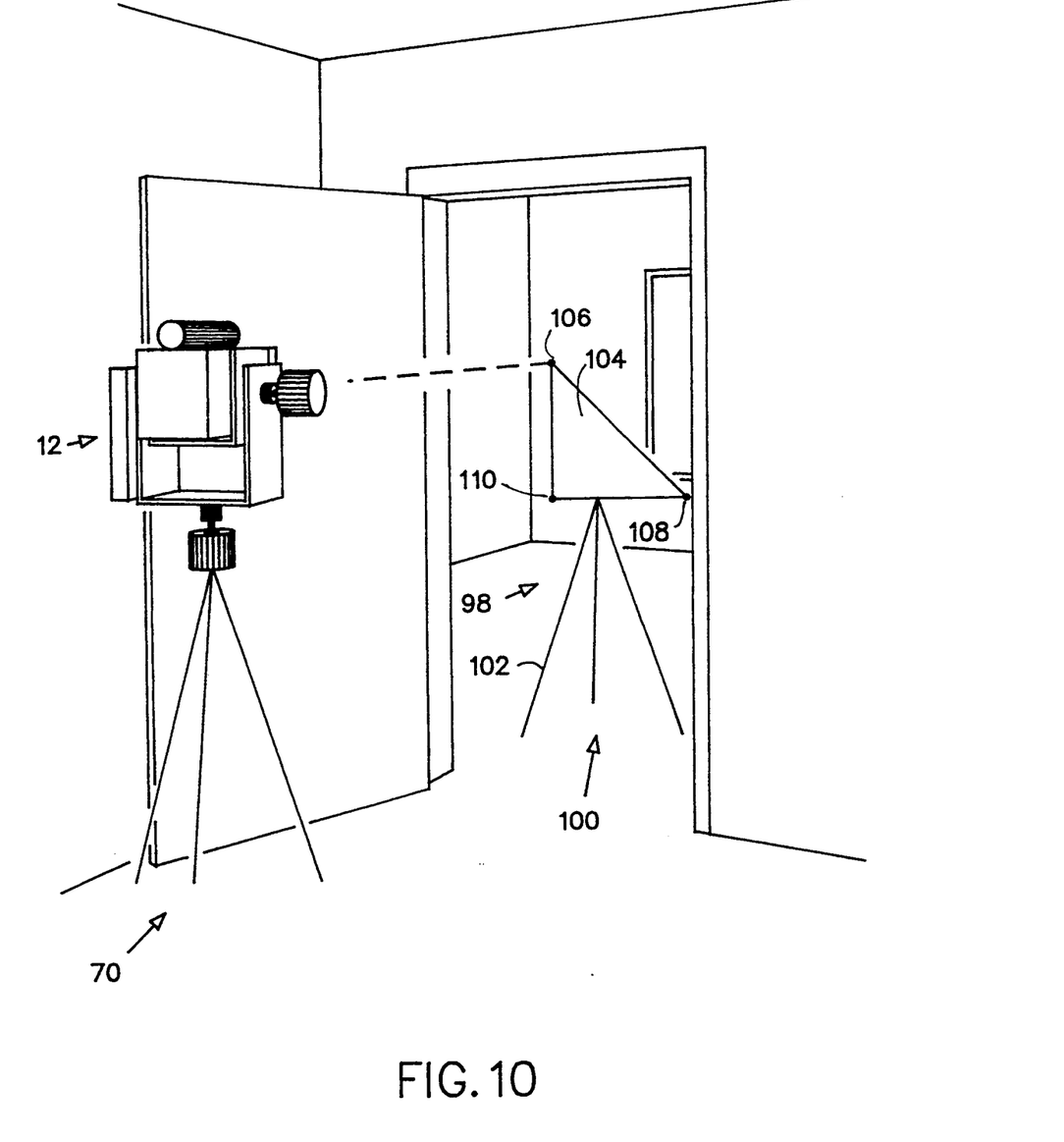
FIG. 10 is a perspective eye-level view of a portion of the first room shown in FIGS. 8 and 9 used to further describe the method described in FIG. 7.
Figure 11:
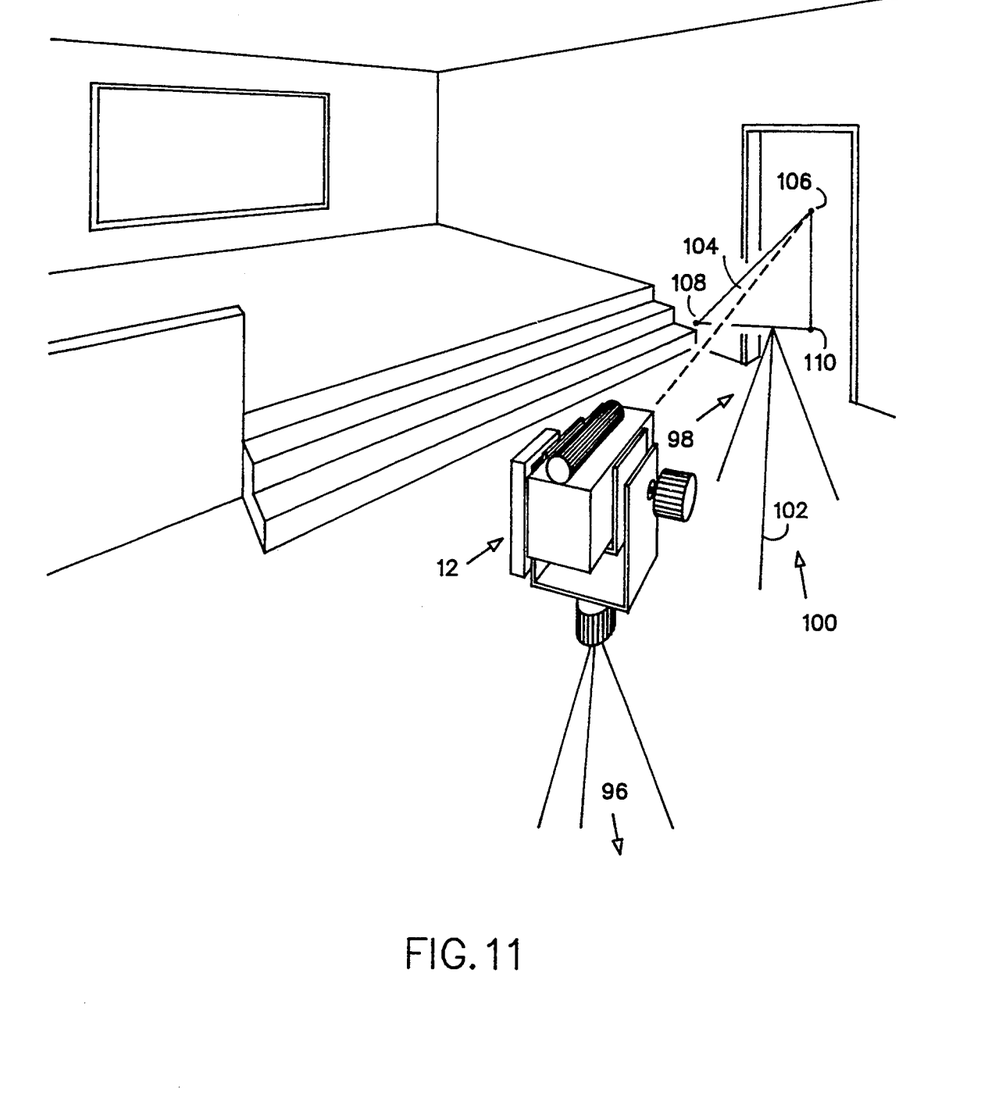
FIG. 11 is a perspective eye-level view of a portion of a second room shown in FIG. 8 used to further describe the method described in FIG. 7.

Referring to FIGS. 8, 10, and 11, the steps are further explained by way of example. The target 98 is positioned so that there is a line of sight from the first measuring location 70 to the target 98 and from the second measuring location 96 to the target 98. The target 98 includes a tripod 102, a planar member 104, and three points on the planar member 104, a first target point 106, a second target point 108, and a third target point 110. The user measures the locations of the first, second and third target points 106, 108, and 110 from the first measuring location 70. Then, the user moves the "static" device 12 to a second measuring location 96 thereby establishing a second local reference frame. The user then measures the location of the three target measuring points 106, 108, and 110 from the second measuring location 96. The coordinates of the three points 106, 108, and 110 in the first local reference frame and in the second local reference frame are then stored in the CAD program database.

Referring again to FIG. 7, from block 7.21, the next step is performing again the step of block 7.04 and calculating a transformation matrix that transforms the coordinates of points in the second local reference frame to coordinates in the global reference frame. The first step in this transformation is calculating a transformation matrix for the transformation of coordinates in the second local reference frame to coordinates in the first local reference frame. This transformation matrix is based upon the relative locations of the three target points 106, 108, and 110 in the two reference frames. The matrix elements are a combination of algebraic and trigonometric components, the derivation of which is based on three dimensional matrix operations and is well known in the art. The resultant matrix converts the coordinates of a measured point from coordinates in the second local reference frame to coordinates in the first local reference frame. When that matrix is multiplied by the matrix that converts coordinates from the first local reference frame to coordinates in the global reference frame, the resultant matrix converts coordinates in the second local reference frame to coordinate in the global reference frame. This technique may be applied sequentially so that points may be measured from a plurality of measuring locations.

An alternative embodiment of this step calculates the transformation matrix in a different manner. This alternative step includes measuring the location of the three target points 106, 108, and 110 from the first local reference frame, converting the coordinates immediately to the global reference frame, moving the "static" device to the second measuring location, and measuring the location of the three target points in the second local reference frame. Then a conversion matrix is derived based upon the coordinates of the three points measured in the second local reference frame and the global reference frame. The derived matrix then converts the coordinates of points directly from the second local reference frame to the global reference frame without first converting the coordinates to the first local reference frame.

Figure 12:
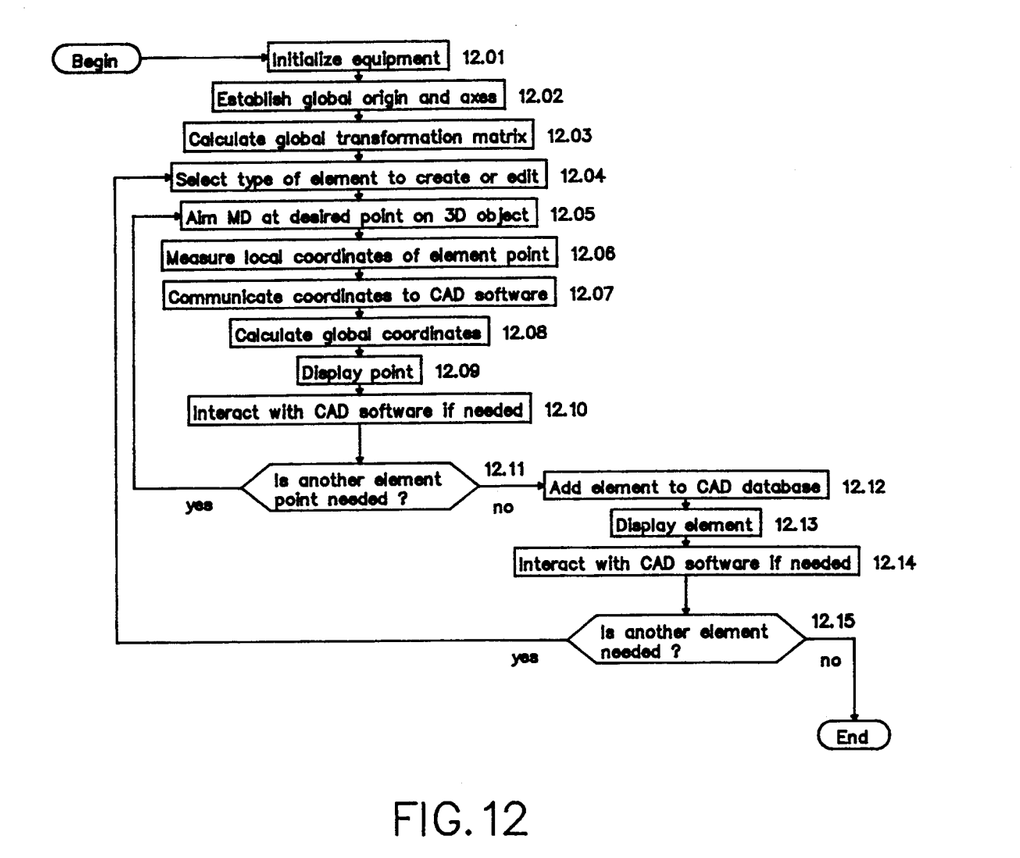
FIG. 12 is a flow chart of a second preferred method embodying the principles of the present invention using the "free floater" measuring device.

The method of the present invention also includes a second preferred method embodying the principles of the present invention using the "free floater" device 12'. Referring to FIG. 12, a flow chart containing the steps of the second preferred method embodying the principles of the present invention, the first step is initializing the equipment (block 12.01). This step includes establishing a local reference frame. Once established, the microcontroller 58 continuously calculates the location and orientation of the "free floater" device 12' in the local reference frame. When a point is measured, the distance to the point from the EDM 32 is recorded as well as the location and orientation of the "free floater" device 12' in the local reference frame. The CAD software then uses this data to calculate the location of the measured point in the local reference frame.

The next step is establishing a global origin and reference frame (block 12.02). Following that step is the step of calculating a transformation matrix that transforms the coordinates of points in the local reference frame to coordinates in the global reference frame (block 12.03)

Next is the step of selecting an element or entity type to be measured (block 12.04). Once selected, the user performs the step of aligning the measuring axis 34 on the desired point (block 12.05). Next is the step of measuring the coordinates of the desired point in the local reference frame (block 12.06). Once the point is measured, the computer communicates the data to the CAD software (block 12.07) and the CAD software then performs the step of calculating the location of the point in the global reference frame (block 12.08). The CAD software next performs the step of displaying the point on the display screen 30 (block 12.09). Once displayed, the user determines whether the point was correctly measured and, if needed, then interacts with the computer aided drafting software (block 12.10).

After the point is measured, the user, as prompted by the CAD software decides whether to measure another point on the element. This decision is represented by block 12.11. If the answer is "YES", the method requires that the steps starting at block 12.05 be performed again. If the answer is "NO", the CAD software then performs the step of adding the element to the CAD program data base (block 12.12). Once written to the data base, the CAD software displays the element on the viewing screen 30 in its final form (block 12.13). If required, the user then interacts with the computer aided drafting program (block 12.14).

The next step is deciding whether to measure another element. This decision is represented by block 12.15. If the user decides to measure another element, an answer of "YES" to test 12.15, the steps beginning at block 12.04 are performed again. If the answer to test 12.15 is "NO", the operation is complete.

The method of the present invention also includes a third preferred method embodying the principles of the present invention that uses the "semi-free floater" device 12''. The method is identical to the second preferred method using the "free floater" device 12' except that points are measured by touching the points with the measuring end 66 of the wand 64 and triggering the "semi-free" floater device 12''. The computer 16 calculates the location of measured points based upon the location and orientation data supplied by the "semi-free floater" device and its knowledge of the length and orientation of the measuring wand 64.

The method of the present invention also includes a feature that allows the user to continually measure points on the element being measured without triggering the measuring device for each point. In this mode, using the "static" device, for example, the user sweeps the measuring axis 34 across desired points while the CAD software and measuring device 12 work in conjunction to measure points on the object at a predetermined rate until directed to cease by the user. This feature is helpful when the element is one including nonplanar surfaces, such as spheres and cylinders where many points must be measured to accurately model the object.

A further feature of the method of the present invention using the "static" device involves the capability of allowing the user to create, edit, and display on the computer screen only those points and elements which are measured from a given measuring device location. These points and elements may be created, edited, or displayed in either the local or global reference frames.

While the present invention has been disclosed in connection with the preferred embodiments thereof, it should be understood that there may be other embodiments which fall within the spirit and scope of the invention as defined by the following claims.

We claim:

1. An apparatus for obtaining a computer model of a large three dimensional object or space, comprising:
   (a) a reference frame establishment means for establishing a stationary local reference frame;
   (b) model element selection means for selecting a model element from a computer menu of available model elements;
   (c) a measuring means for obtaining data in the local reference frame on the dimensional properties of an actual element in a three dimensional object or space that is being modeled;
   (d) a data transmission means for transmitting the data from the measuring means;
   (e) a computer means for receiving the transmitted data and for creating a model of the actual element that becomes part of a model of the object or space as the data is acquired; and
   (f) a display means for displaying a visual image of the model of the object or space.

2. The apparatus of claim 1, wherein the measuring means includes:
   (a) a distance measuring device that measures the distance from the measuring device to a point on the three dimensional object along a measuring axis;
   (b) an articulated yoke for mounting the distance measuring device such that the measuring device rotates on two orthogonal axes; and
   (c) a sensing means for sensing the yoke's rotational attitude on the two orthogonal axes.

3. The apparatus of claim 1, wherein the measuring means includes:
   (a) a distance measuring device that a measures the distance from the measuring device to a point on the three dimensional object or space along a measuring axis;
   (b) an inertial measurement unit including a plurality of linear and angular accelerometers; and
   (c) a computing means for computing the location and orientation of the distance measuring device in a stationary reference frame, based upon readings from the inertial measurement unit.

4. The apparatus of claim 1, wherein the measuring means includes:
   (a) an extension wand of a known length that lies along a measuring axis and includes a first end used for touching points on the three dimensional object or space and a second end used for mounting the extension wand in a handle;
   (b) an inertial measurement unit including a plurality of linear and angular accelerometers; and
   (c) a computing means for computing the location and orientation of the extension wand in a stationary reference frame, based upon readings from the inertial measurement unit.

5. A method for producing a computer model of a large three dimensional object or space, comprising the steps of:
   (a) establishing a stationary local reference frame;
   (b) selecting an element to be measured from a computer menu;
   (c) measuring the coordinates of a plurality of points on the element in the local reference frame;
   (d) inputting the coordinates of the points in the local reference frame to a computer program; and
   (e) displaying a visual image of the measured points and elements on a display means in the local reference frame as data on the points and elements is acquired and processed.

6. The method of claim 5 further comprising the steps of:
   (a) establishing a stationary global reference frame;
   (b) calculating the coordinates of the plurality of measured points in the global reference frame;
   (c) displaying a visual image of the measured points and elements on a display means in the global reference frame as the points are acquired and processed.

7. The method of claims 5 or 6, wherein the step of measuring the coordinates of a plurality of points on the element in the local reference frame further comprises the steps of:
   (a) measuring the distance along a measuring axis to a plurality of points on the element from a stationary measuring location with a distance measuring device;
   (b) reading the orientation of the distance measuring device along two orthogonal axes when the distance to each of the points on the element is measured; and
   (c) calculating the coordinates of the measured points in the local reference frame.

8. The method of claim 7, further comprising the steps of:
   (a) measuring the coordinates of at least three stationary non-collinear reference points in a first reference frame;
   (b) moving the measuring device to a new location that has an unobstructed line of sight to the reference points;
   (c) measuring the coordinates of the three stationary non-collinear reference points in a second reference frame; and
   (d) transforming the coordinates of a point in the second reference frame to coordinates in the first reference frame.

9. The method of claim 8 wherein:

(a) the first reference frame is a first local reference frame; and
(b) the second reference frame is a second local reference frame.

10. The method of claim 8 wherein:
(a) the first reference frame is the global reference frame; and
(b) the second reference frame is a second local reference frame.

11. The method of claim 5 or 6, wherein the step of measuring the coordinates of a plurality of points on the element in the local reference frame further comprises the steps of:
(a) measuring the distance along a measuring axis to a plurality of points on the element with a measuring device that includes a plurality of linear and angular accelerometers;
(b) calculating the position and location of the measuring device in the local reference frame based upon readings from the accelerometers; and
(c) calculating the coordinates of the measured points in the local reference frame.

12. The method of claim 5 or 6, wherein the step of measuring the coordinates of a plurality of points on the element in the local reference frame further comprises the steps of:
(a) touching a plurality of points on the element along a measuring axis with a measuring device that includes a plurality of linear and angular accelerometers;
(b) calculating the position and location of the measuring device based upon readings from the accelerometers; and
(c) calculating the coordinates of the measured points in the local reference frame.

13. The method of claim 5 wherein the step of measuring the coordinates of a plurality of points on the element in the local reference frame further includes the step of continuously measuring the coordinates of points on the element.

14. The method of claim 5 further comprises the step of:
(a) storing the coordinates of measured points in the local reference frame.

* * * * *